US006849677B2

(12) United States Patent
Overholt

(10) Patent No.: US 6,849,677 B2
(45) Date of Patent: Feb. 1, 2005

(54) FLAME RETARDANT POLYOLEFIN PALLETS AND FLAME RETARDANT MASTER BATCH FOR THEIR PRODUCTION

(75) Inventor: Trenton M. Overholt, Manhattan Beach, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 125 days.

(21) Appl. No.: 10/244,994

(22) Filed: Sep. 17, 2002

(65) Prior Publication Data

US 2004/0054052 A1 Mar. 18, 2004

(51) Int. Cl.[7] ............................. C08K 3/22; C08K 5/03; B65D 19/00
(52) U.S. Cl. ....................... 524/412; 523/351; 524/437; 524/464; 524/469; 108/53.5; 108/53.7; 108/53.34; 108/57.12; 108/901; 108/902
(58) Field of Search ......................... 523/351; 524/412, 524/464, 469, 437; 108/53.5, 53.7, 53.34, 57.12, 901–902

(56) References Cited

U.S. PATENT DOCUMENTS

| | | | |
|---|---|---|---|
| 3,572,535 | A | 3/1971 | Kinzie |
| 4,727,102 | A | 2/1988 | Scarso |
| 5,687,652 | A | 11/1997 | Ruma |
| 5,879,495 | A | 3/1999 | Evans |
| 6,199,488 | B1 | 3/2001 | Favaron et al. |
| 6,228,914 | B1 | 5/2001 | Ford et al. |
| 6,344,508 | B1 * | 2/2002 | Endo et al. .................. 524/313 |
| 2001/0029874 | A1 | 10/2001 | Muirhead |
| 2001/0031807 | A1 | 10/2001 | Adedeji et al. |
| 2002/0175435 | A1 | 11/2002 | Weiland et al. |
| 2003/0079658 | A1 | 5/2003 | Torrey et al. |
| 2003/0079660 | A1 | 5/2003 | Torrey et al. |

FOREIGN PATENT DOCUMENTS

| | | |
|---|---|---|
| JP | 11-278485 | 10/1999 |
| WO | WO 00/20495 | 4/2000 |
| WO | WO 20495 | 4/2000 |
| WO | WO 03/035495 | 5/2003 |
| WO | WO 03/035496 | 5/2003 |

OTHER PUBLICATIONS

"Intumescents: Coating Contains Dual Components," Flame Retardancy News, vol. 11; Issue 7, Jul. 1, 2001.
Renstrom, R., "Clean Rooms Getting Cleaner," Plastics News, vol. 13, N. 30, Sep. 24, 2001.
"Prototype Production will Utilize Breakthrough Thermoplastic Flow Forming Technology to Achieve Superior Performance and Economic Results," Las Vegas Business Wire, Jul. 23, 2001.
English Abstract corresponding to JP 11278485 A.
Underwriters Laboratories, Inc. "UL 2335 Performance Testing".

* cited by examiner

*Primary Examiner*—Peter Szekely
(74) *Attorney, Agent, or Firm*—Brooks Kushman P.C.

(57) ABSTRACT

Polyolefin-based pallets capable of passing standard pallet flammability tests are prepared by molding the pallet or one or more subassemblies thereof, of a polyolefin molding resin containing a flame retardant package containing a halogenated organic flame retardant, alumina trihydrate, and antimony trioxide. The flame retardants are advantageously supplied as a master batch at a concentration higher than that desired in the pallet or subassembly, in a polyolefin-compatible polymer.

20 Claims, 1 Drawing Sheet

FLAME RETARDANT POLYOLEFIN PALLETS AND FLAME RETARDANT MASTER BATCH FOR THEIR PRODUCTION

BACKGROUND OF THE INVENTION

1. Field of the Invention

The present invention pertains to flame retardant shipping pallets of polyolefin plastic.

2. Background Art

In the past, shipping pallets were made largely of wood. More recently, numerous materials have at least partially superseded wood-based pallets. For example, pallets of injection molded polymers are being used increasingly. Such polymer pallets have numerous advantages. For example, polymer pallets are capable of being molded in complex shapes which facilitate the shipping of numerous types of articles. Polymer pallets are also easy to clean, which encourages their reuse.

Wood pallets are inherently combustible, and are rather easily ignited. While polymer articles are in general somewhat more difficult to ignite, once ignited they also constitute combustible products, and pound for pound have more potential energy than wood articles. In the shipping industry, empty pallets are often stacked together for reuse or for return to the shipper ("idle storage"). When wood pallets are so stacked and ignited, the fire is generally concentrated in an upward direction. However, when polymer pallets burn, in addition to having greater potential energy (combustibility), the flame can also spread downward by dripping. Thus, the combustion of polymer pallets involves more heat and more potential energy, a combustion mechanism not found in wood pallets. Thus, it is desirable to minimize the combustibility and heat release, and in turn lower the flame spread of polymer based pallets.

One solution which has been proposed is to produce pallets of polymers which are less flammable than pallets of commodity resins, such as polyolefins. However, such speciality polymers, e.g. polyphenylene oxide polymers, are considerably more expensive than the polyolefin polymers conventionally used to manufacture pallets. Such specialty polymers are also, in general, much more difficult to mold than polyolefins.

A standard test for pallet flammability has been established by Underwriters Laboratories, as UL 2335 "Fire Tests of Storage Pallets," referred to, for example, in WO 00/20495. In one version of this test, the "Idle Pallet Test," six stacks of pallets are assembled in a 2×3 array with a 6" longitudinal flue space longitudinally between arrays in a room with a 30 foot high flat ceiling having 165° F. (74° C.) standard response sprinklers having a design density of 0.60 gpm/ft². An instrumented steel beam is placed near the ceiling, and the pallets are ignited by hydrocarbon soaked cellulosic bundle positioned in the flue space. The parameters assessed include flame spread, maximum steel beam temperature, and number of sprinklers activated. As can be seen, this test is a rather stringent one.

In a second version of the test, the so-called "Commodity Storage Test," a 2×2×2 array 1 of pallets 5, each carrying a Class II commodity carton 2, are placed 25 feet (7.5 m) below a 10 M watt heat release calorimeter 3 and ignited by four igniters in the center flue space, each igniter comprising a 3 inch (12.5 cm) cellulosic bundle soaked with 4 oz. (112 g) heptane in a polyethylene bag. Overhead sprinklers 4 at a height of 10 feet (3 m) are activated electromechanically when the instrumentation indicates that a sprinkler activation temperature of 286° F. (141° C.) has been reached. A series of three tests is made, with water application rates of 0.11, 0.21, and 0.31 gpm/ft². In each test, four parameters are noted: maximum one minute mean total heat release rate; maximum one minute mean convective heat release rate; effective convective heat release rate, defined as the average convective heat release rate measured over five minutes of the most intense fire; and convective energy, the average convective heat release rate measured over the 10 minutes of most severe burning.

Although numerous flame retardants and combinations thereof are known for use in plastic articles, the stringent tests required of pallets render flame retardancy results unpredictable. Numerous flame retardants and combinations have been tested, and while many of these have been found suitable for polyolefin articles other than pallets, their use in pallets has not proven acceptable.

WO 00/20495 discloses pallets prepared from specialty resins such as polyphenylene ether resins, polycarbonate resins, vinyl aromatic graft copolymer resins, and polyetherimide resins further including arylphosphate esters and zinc chalcogenides. In U.S. Pat. No. 4,727,102, "self extinguishing" polyolefins are disclosed containing major amounts of ammonium polyphosphate, tris(2-hydroxyethyl) isocyanurate, and melamine cyanurate. However, the large amounts of additives (40%) severely compromise the properties of products prepared from the polyolefin resin.

It would be desirable to provide a polyolefin composition suitable for use in molding pallets which is injection moldable, exhibits good flame retardance in standard tests, and which is commercially cost effective. However, until now, tests of flame retardant systems for use in polyolefin polymer pallets did not result in satisfactory performance.

SUMMARY OF THE INVENTION

It has now been surprisingly discovered that polyolefin-based plastic pallets can be manufactured which satisfactorily pass standard pallet flammability tests, when the polyolefin is compounded with a fire retardant package comprising minimally a halogenated flame retardant, alumina trihydrate, and antimony trioxide. The flame retardant ingredients are preferably supplied as a master batch and incorporated into conventional polyolefin molding resins prior to injection molding.

DETAILED DESCRIPTION OF THE PREFERRED EMBODIMENTS

Figure 1:
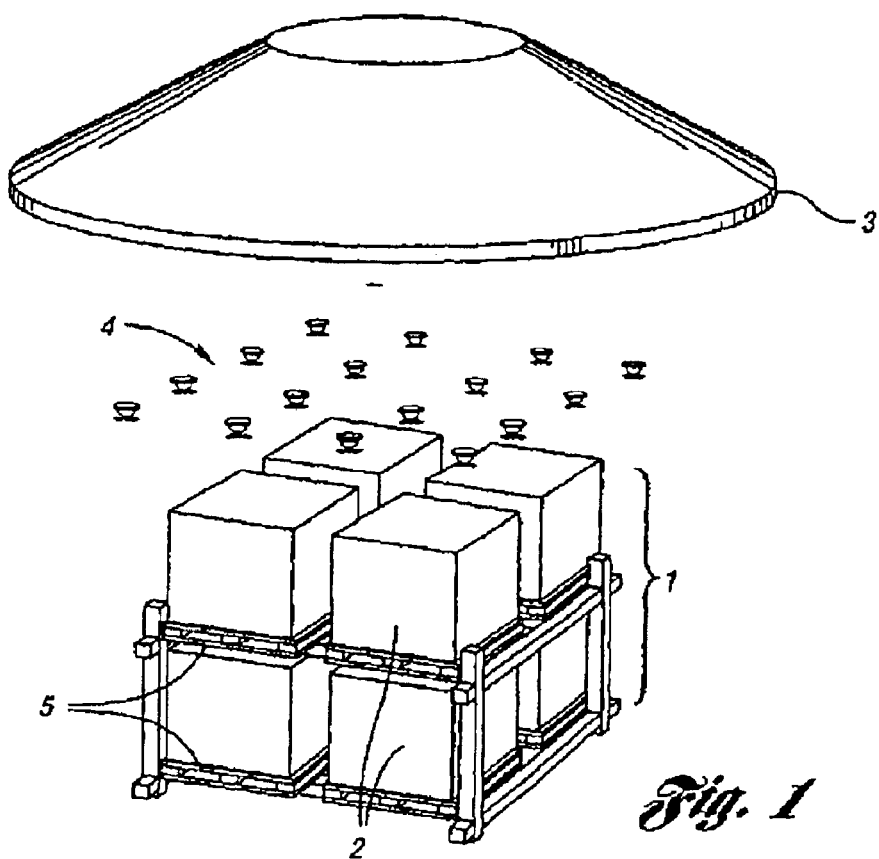
FIG. 1 illustrates a typical Commodity Storage Test setup to assess flammability characteristics of pallets.

The polymer pallets of the present invention may take numerous forms. It has been found convenient to mold pallets in several subassemblies and assemble the pallets together by snap fittings, fusion or adhesive bonding, or by a variety of such assembly techniques. In this manner, non-load bearing areas may be made of thinner section, thus minimizing raw material usage. Moreover, use of a plurality of subassemblies allows pallets of more complex shape to be produced.

The polymer of which the pallets of the subject invention are constructed is polyolefin, although it is not necessary to form all parts of these polymers. Pallet portions which contribute more to ease of flammability or flame spread may be made of other polymers which are less flammable than polyolefin or which tend to melt and/or drip less than polyolefin. A pallet construction which employs portions of different flammabilities which takes advantage of these characteristics is disclosed in commonly assigned U.S. application Ser. No. 10/040,098, filed Oct. 19, 2001, incorporated herein by reference.

The polyolefin polymers may be, for example, but not by way of limitation, polyethylene, polypropylene, or polybutylene. In general, the polyolefin polymers are copolymers, for example copolymers of ethylene with propylene, 1-butene, 1-hexene, 1-octene, or mixtures thereof, or copolymers of propylene with ethylene, 1-butene, 1-hexene, 1-octene or mixtures thereof. Homo and copolymers of propylene are preferred. Different polyolefin polymers may be used for various subassemblies. Polymer blends of polyolefins with other compatible thermoplastics or with elastomeric tougheners such as elastomeric polymers of styrene, butadiene, alkyl acrylates, and the like are also useful. When such tougheners are used, they are generally present in the form of relatively small particles, or as interpenetrating polymer networks, as is well known in the art of toughened thermoplastics.

The polyolefin polymers may also be reinforced or filled. Suitable fillers include typical reinforcing and non-reinforcing fillers such as precipitated and fumed silicas, ground quartz, diatomaceous earth, ground limestone, ground dolomite, ground felspar, mica, expanded mica, precipitated calcium carbonate, etc. The term "reinforcing" with respect to fillers generally refers to fillers of small size and high surface area, for example mean particle sizes <1 $\mu$m and specific surface areas (BET) of 50 $m^2/g$ or higher. Suitable fibrous fillers are typically short or long glass fibers. Other fibrous reinforcement such as aramid fiber, carbon fiber, boron nitride fiber, etc., may also be used, however such materials are generally more expensive than glass fibers. Some subassemblies may be filled or may contain fibrous reinforcement whereas other subassemblies may not, or may contain differing reinforcement and/or fillers. Use of continuous fiber reinforcement is also possible in some cases, particularly when polyolefin-based GMT intermediate products are used for molding, or when resin transfer molding and similar techniques are used.

The pallet or at least one of its component subassemblies must contain a flame retardant "FR" package in accordance with the subject invention. The subject invention FR package includes, in percent by weight relative to the total weight of polyolefin and FR package, from 4 to 14% halogenated organic flame retardant, preferably 7 to 12%, and more preferably 8 to 11%; from 4–15%, more preferably 8 to 12% and most preferably 9–11% alumina trihydrate; and 1–5%, more preferably 2 to 4% and most preferably about 3% antimony trioxide ($Sb_2O_3$), these percentages being weight percents based on the weight of polymer and flame retardants. In particular, an FR package containing 8–10% halogenated organic flame retardant, 9–10% alumina trihydrate, and 3% antimony trioxide is used.

The halogenated organic flame retardant includes polyhalogenated organic compounds such as polybrominated biphenyl oxides, halogenated phosphate esters such as tris (2-chloroethyl)phosphate and the like. However, the most preferred halogenated organic flame retardants comprise tetrabromobisphenol A ("TBBA") or admixtures of the latter with other halogenated organic flame retardants. Most preferably TBBA is present in an amount of 50% by weight or more relative to the total halogenated organic flame retardant.

The flame retardant ingredients, when solid, are supplied in pulverulent form, and may be incorporated into the polyolefin by conventional techniques, i.e. in mixers or blenders, but preferably in an extruder. It has been found that preparation of a master batch of the same or different polyolefin or other polyolefin compatible polymer, and containing approximately 2 to 5 times, preferably 2.5 to 4 times the final FR weight percentage is particularly useful. For example, a master batch containing about 30 weight percent organic flame retardant, 32 weight percent alumina trihydrate, and 10% antimony trioxide, balance polypropylene polymer, is highly useful. The master batch is then blended or "diluted" with additional polymer in an extruder prior to injection molding. By "extruder" is meant a screw-type device used to blend thermoplastics to form extrudates or to supply molten thermoplastic to an injection molding machine. The term should not be viewed as limiting, and other mixers may in principle be used.

By the term "polyolefin compatible" or simply "compatible" is meant a polymer which can be blended with polyolefin molding resin and molded into a polyolefin pallet or subassembly thereof while maintaining sufficient strength properties. The compatible polymer may phase separate to form small polymer particles or an interpenetrating polymer network, or may be miscible with the polyolefin. It is preferred that the compatible polymer be itself a polyolefin, particularly the same polyolefin or a polyolefin similar in composition to the polyolefin molding resin. For example, when polypropylene homopolymers or copolymers are used as the polyolefin molding resin, it is preferred that a polypropylene polymer be the polyolefin-compatible polymer of the flame retardant master batch.

The FR package of the present invention may also be used with auxiliary flame agents. Examples include nitrogenous organic compounds such as urea, melamine, and formaldehyde condensates thereof, in the form of powders, prills, fibers, etc., intumescents such as sugars and starches; carbon dioxide generators such as the various metal carbonates, and water generators such as hydrated metal salts. This list is exemplary, and not limiting.

Thus, in preferred embodiments, the pallets of the subject invention are molded of a plurality of subassemblies, which are then joined together, preferably by fusion bonding. In this manner, the composition of the various subassemblies may be varied to optimize pallet physical properties as well as flame retardant properties. For example, one or more of the subassemblies may contain a filler, fibrous reinforcement, or both. Likewise, as indicated previously, those subassemblies which contribute most to flammability may be more highly filled and may also contain higher levels of flame retardant. This is particularly true of the top deck of the pallet. Preferably, all subassemblies contain flame retardant, however.

Preferred pallets have a top deck, a bottom deck, and most preferably a plurality of columns between the top and bottom decks. At least the top deck and preferably all subassemblies are molded from polyolefin resin to which has been added a flame retardant master batch comprising 20 weight percent or more, preferably 20 to 25 weight percent, and most preferably 25 to 35 weight percent of one or more halogenated flame retardant(s); 20 weight percent or more, preferably 20 to 40 weight percent, and more preferably 25 to 40 weight percent alumina trihydrate; and 6 weight percent or more, preferably 6 to 15 weight percent, and more preferably 8 to 12 weight percent of antimony trioxide, at least 10% by weight of the master batch being an olefin compatible polymer.

Having generally described this invention, a further understanding can be obtained by reference to certain specific examples which are provided herein for purposes of illustration only and are not intended to be limiting unless otherwise specified.

EXAMPLE 1 AND COMPARATIVE EXAMPLE C1

Pallets were manufactured by injection molding of subassemblies from polypropylene resin. The subassemblies were assembled into completed pallets and joined together by fusion bonding. The pallet of Example 1 included the FR package of the present invention, added as a master batch containing 30% FR-720 halogenated organic flame retardant, 32% alumina trihydrate, and 10% antimony trioxide, remainder polypropylene. The master batch was added to the extruder with polypropylene resin such that the final polymer of the Example 1 pallet contained 9% FR-720 halogenated organic flame retardant, 9.6% alumina trihydrate, and 3% antimony trioxide. The comparative Example C1 contained no FR package.

|  | Pallet Example | |
| --- | --- | --- |
|  | 1 | C1 |
| Idle Storage Test | pass | fail |
| Commodity Storage Test | pass | fail |

EXAMPLE 2 AND COMPARATIVE EXAMPLE C2

Figure 2:
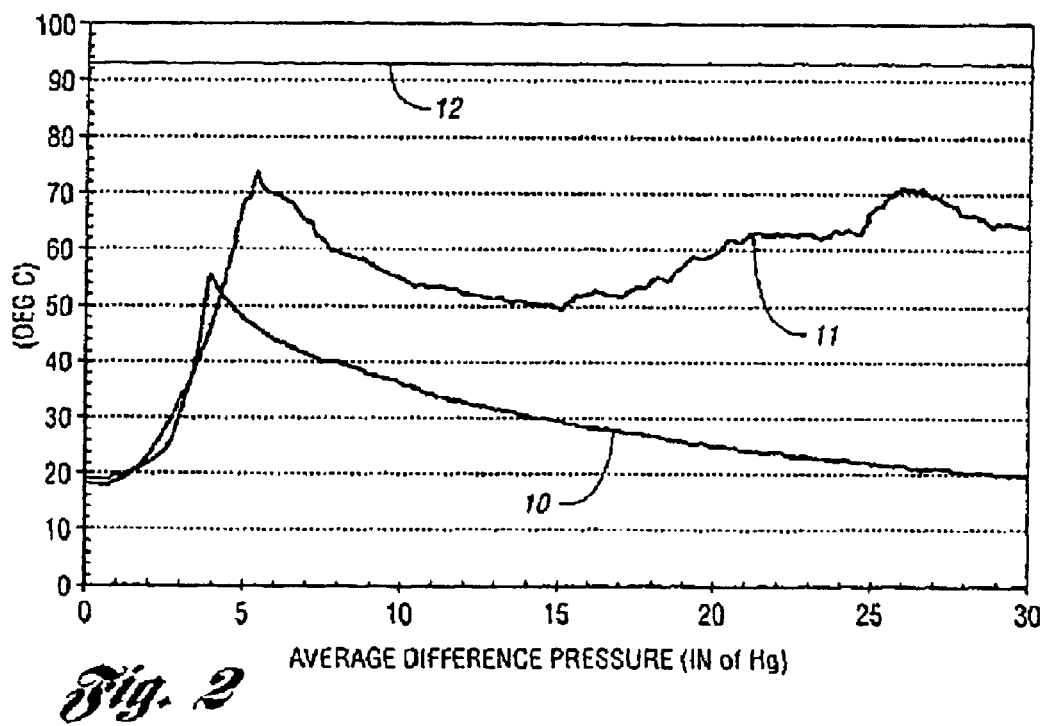
FIG. 2 illustrates the average steel beam temperature in an Idle Storage Test of flame retardant polymer pallets of the subject invention and similar sized softwood pallets.

An Idle Storage Test as previously described was conducted in stacked 48×40 two-piece construction polymer pallets (polypropylene) which include the FR composition of the subject invention (Example 2). The average steel beam temperatures were plotted against time for these subject invention pallets and standard 48×40 softwood pallets. The results were presented graphically in FIG. 2. The subject invention pallets produced considerably lower temperatures 10 than the wood pallets 11, and pass the Idle Storage Test. Polyolefin pallets containing no FR package exhibit higher temperatures than do the softwood pallets, and do not pass the test. The horizontal line 12 represents the pass/fail limit.

The results indicate that the flame retardant package of the subject invention is suitable for use in pallets, where unique flame retardant properties are required. The subject invention pallet Example 1 was able to pass both Underwriters Laboratory pallet tests, while a similar pallet of the same base molding resin did not. Likewise, the Example 2 pallet shows considerable improvement over wood pallet flammability.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A flame retardant molded polyolefin pallet comprising one or more subassemblies, at least one subassembly comprising a polyolefin containing a flame retardant package comprising as flame retardant components a) 4–14% halogenated organic flame retardant, b) 4–15% alumina trihydrate, and c) 1–5% antimony trioxide, said percentages based on the weight of polyolefin and the sum of flame retardant components a) to c).

2. The pallet of claim 1 wherein the flame retardant components comprise a) 7–12% halogenated organic flame retardant;

b) 8–12% alumina trihydrate;

c) 2–4% antimony trioxide; and said percentages based on the weight of polyolefin and the sum of flame retardant components a) to c).

3. The pallet of claim 1, wherein subassemblies which comprise the most flammable portions of said pallet contain said flame retardant components.

4. The pallet of claim 1, wherein all of said subassemblies contain said flame retardant components.

5. The pallet of claim 1, wherein said polyolefin comprises polypropylene.

6. The pallet of claim 1, wherein said one or more subassemblies containing said fire retardant components further comprise a filler, fibrous reinforcement, or both filler and fibrous reinforcement.

7. The pallet of claim 1, further comprising one or more auxiliary flame retardants.

8. The pallet of claim 1, wherein said halogenated flame retardant comprises tetrabromobisphenol A.

9. A process for the manufacture of a flame retardant polyolefin pallet or subassembly thereof, comprising a) supplying a polyolefin molding resin b) supplying a flame retardant package comprising flame retardant components b)i) from 4–14% halogenated organic flame retardant;

b)ii) from 4–15% alumina trihydrate;

b)iii) from 1–5% antimony trioxide;

c) uniformly blending said polyolefin resin with the components b)i to b)iii of said flame retardant package to form a flame retardant-containing polyolefin molding resin; and d) molding a polyolefin pallet or subassembly thereof from said flame retardant-containing polyolefin molding resin.

10. The process of claim 9, wherein said flame retardant components are supplied in a master batch of a polyolefin compatible polymer resin containing said flame retardant components in an amount higher than the amount desired in said pallet or subassembly thereof, and supplying sufficient polyolefin to reduce the level of said flame retardant components to the range of 4–14% a), 4–15% b), and 1–5% c).

11. The process of claim 9, wherein said pallet comprises at least a top deck and a bottom deck, optionally having a plurality of columns between said top deck and said bottom deck, at least one of said top deck, said bottom deck, or said columns being molded from a polymer of different flammability characteristics than another of said top deck, bottom deck, or columns.

12. The process of claim 11, comprising molding said top deck of said flame retardant-containing polyolefin molding resin.

13. The process of claim 11, further comprising constructing said top deck or a portion thereof of a non-polyolefin polymer which exhibits greater inherent flammability resistant characteristics than polyolefin.

14. The process of claim 9, wherein said polyolefin comprises polypropylene.

15. The process of claim 9, wherein said polyolefin pallet or subassembly thereof further contains a filler, fibrous reinforcement, or a mixture thereof.

16. A flame retardant polymer master batch suitable for addition to a polyolefin molding resin to prepare the pallet or subassembly thereof of claim 1, said master batch comprising 20 weight percent or more halogenated organic flame retardant, 20 weight percent or more of alumina trihydrate; 6 weight percent or more of antimony trioxide, and at least 10 weight percent of a polymer which is compatible with polyolefin in injection molding.

17. The master batch of claim 16, comprising 20 to 25% halogenated flame retardant, 20 to 40% alumina trihydrate, 6 to 15% antimony trioxide, and minimally 10% polyolefin-compatible polymer, said percentages being based on the total weight of the master batch.

18. The master batch of claim 16, comprising 25–35% halogenated organic flame retardant, 25–40% alumina trihydrate, and 8–12% antimony trioxide, balance polyolefin.

19. The master batch of claim 16 wherein said polyolefin comprises polypropylene.

20. The master batch of claim 16, wherein said halogenated organic flame retardant comprises tetrabromobisphenol A.

* * * * *